(12) United States Patent
Daniel et al.

(10) Patent No.: US 10,300,413 B2
(45) Date of Patent: May 28, 2019

(54) DEVICE FOR TRIGGERING AN ELECTRICAL SIGNAL FOR A FILTER WITH AN AQUEOUS SOLUTION

(71) Applicant: DELPHI TECHNOLOGIES IP LIMITED, St. Michael (BB)

(72) Inventors: Patrick Daniel, Blois (FR); Alain Amand, Blois (FR)

(73) Assignee: DELPHI TECHNOLOGIES IP LIMITED (BB)

(*) Notice: Subject to any disclaimer, the term of this patent is extended or adjusted under 35 U.S.C. 154(b) by 87 days.

(21) Appl. No.: 15/102,913

(22) PCT Filed: Dec. 4, 2014

(86) PCT No.: PCT/EP2014/076641
§ 371 (c)(1),
(2) Date: Jul. 27, 2016

(87) PCT Pub. No.: WO2015/086440
PCT Pub. Date: Jun. 18, 2015

(65) Prior Publication Data
US 2016/0325210 A1    Nov. 10, 2016

(30) Foreign Application Priority Data
Dec. 12, 2013 (FR) ...................... 13 62510

(51) Int. Cl.
*B01D 35/18* (2006.01)
*B01D 35/143* (2006.01)
(Continued)

(52) U.S. Cl.
CPC ............. *B01D 35/18* (2013.01); *B01D 29/60* (2013.01); *B01D 29/608* (2013.01);
(Continued)

(58) Field of Classification Search
CPC .. B01D 35/18; B01D 35/1435; B01D 35/143; B01D 29/60; B01D 29/608; B01D 53/9418; B01D 2201/403
(Continued)

(56) References Cited

U.S. PATENT DOCUMENTS

| 2004/0191093 A1* | 9/2004 | Weigl ................ F01N 3/2066 417/413.1 |
| 2013/0126416 A1* | 5/2013 | Weindorf ............... B01D 29/21 210/444 |

FOREIGN PATENT DOCUMENTS

| WO | 2011/0602254 A1 | 5/2011 |
| WO | 2012/007337 A1 | 1/2012 |

(Continued)

OTHER PUBLICATIONS

WO2012/007337, Nageldinger, Jan. 2012.*
WO2013178352 English translated description, Dec. 2013.*
WO2013178352 English translated drawings. Dec. 2013.*

*Primary Examiner* — Robert Clemente
*Assistant Examiner* — Akash K Varma
(74) *Attorney, Agent, or Firm* — Joshua M. Haines

(57) ABSTRACT

A filter for an aqueous solution, such as urea, of a diesel vehicle selective catalytic reduction system, includes a housing provided with an inlet and with an outlet and, inside which, is arranged a filter element. Variations in volume associated with changes in phase of the aqueous solution are detected and a switch which switches upon changes in phase of the aqueous solution signals the variations in volume.

10 Claims, 4 Drawing Sheets

(51) Int. Cl.
*B01D 29/60* (2006.01)
*B01D 53/94* (2006.01)

(52) U.S. Cl.
CPC ...... *B01D 35/1435* (2013.01); *B01D 53/9418* (2013.01); *B01D 2201/403* (2013.01)

(58) Field of Classification Search
USPC .......................................................... 210/85
See application file for complete search history.

(56) References Cited

FOREIGN PATENT DOCUMENTS

| WO | WO 2012007337 A1 * | 1/2012 | ............. B01D 29/21 |
| WO | 2013/178352 A1 | 12/2013 | |
| WO | WO 2013178352 A1 * | 12/2013 | ............. B01D 35/30 |

* cited by examiner

DEVICE FOR TRIGGERING AN ELECTRICAL SIGNAL FOR A FILTER WITH AN AQUEOUS SOLUTION

CROSS REFERENCE TO RELATED APPLICATIONS

This application is a national stage application under 35 USC 371 of PCT Application No. PCT/EP2014/076641 having an international filing date of Dec. 4, 2014, which is designated in the United States and which claimed the benefit of FR Patent Application No. 1362510 filed on Dec. 12, 2013, the entire disclosures of each are hereby incorporated by reference in their entirety.

TECHNICAL FIELD

The present invention relates to the field of aqueous-solution filters applied to selective catalytic reduction systems for internal combustion engines.

TECHNOLOGICAL BACKGROUND OF THE INVENTION

The present invention relates to the filtration devices used in selective catalytic reduction (SCR) systems. An SCR system is a pollution-control system which reduces emissions of nitrogen oxides (NOx), making it possible to comply with the Euro 6 standard in NOx emission limits. Various SCR technologies have been developed, based on solutions of urea. Injecting urea into the exhaust allows reduction of nitrogen oxides NOx using catalysts in the presence of oxygen. The aqueous solution containing 32% urea is the eutectic aqueous solution and defines the standard reducing agent referred to as AUS32, AdBlue®, or DEF (Diesel Exhaust Fluid). However, this eutectic aqueous solution suffers from problems which increase the complexity of installing it, such as, amongst other things, its −11° C. freezing point, which means that solutions such as heating the aqueous liquid so that the SCR system remains functional have been researched. There is another aqueous solution made up of urea and ammonium formate the freezing point of which is at −30° C. Heating solutions have been proposed for solving the problem of a −11° C. freezing point, such as in-built heating elements (FR2916188). For its information, the control logic conventionally uses the temperature information to trigger the heating of the aqueous solution. In addition, because the solutions may contain impurities and the freezing point values may range from −11° C. to 0° C., the control logic has therefore to actuate the heating up to 0° C. in order to ensure the switch from the solid phase to the liquid phase. WO 2013/178352 discloses the use of a pressure sensor arranged in the filter and allowing indirect determination of variations in volume.

We are going to set out the invention which proposes a device for triggering the system for heating the aqueous solution when the aqueous solution is in the solid phase.

SUMMARY OF THE INVENTION

The present invention seeks notably to address the above-mentioned problems by proposing a solution that detects the phase of the solution, whether it be solid or liquid, thus allowing the heating of the aqueous solution to be triggered. The aqueous solution may be a solution based on urea. The diesel vehicle selective catalytic reduction system comprises a housing provided with an inlet and with an outlet and, inside which, is arranged a filter element, and with a means of detecting variations in volume associated with the changes in phase of the aqueous solution, characterized in that the filter additionally is provided with signaling means for signaling said changes in volume of the phase of the aqueous solution. The signaling means may comprise a switch that switches upon changes in phase. In addition, the signaling means comprise a deformable membrane collaborating with the switch to signal a change in phase. Also, the membrane defines an expansion chamber for said variations in volume. The chamber may be filled with a gas or with a soft foam. The membrane may also be planar.

The switch may also be situated in the expansion chamber.

The switch may comprise at least one contact arranged on the membrane.

The Reed-type switch may also be activated by a magnet, the switch or the magnet being arranged on the membrane. The filter additionally comprises a heating means built into the filter element.

BRIEF DESCRIPTION OF THE DRAWINGS

Further features, objects and advantages of the invention will become apparent from reading the detailed description which will follow, and from studying the attached drawings, given by way of nonlimiting example and in which.

DESCRIPTION OF THE PREFERRED EMBODIMENTS

In the remainder of the description, elements that are identical or similar will be denoted by the same references. For the sake of clarity and conciseness of the description, a top to bottom orientation according to the direction of the figure will be used without implying any limitation as to the extent of the protection, notably with regard to the various ways in which a filter housing can be installed. Words such as "top, bottom, lower, upper, etc." will be used without implying limitation.

Figure 1:
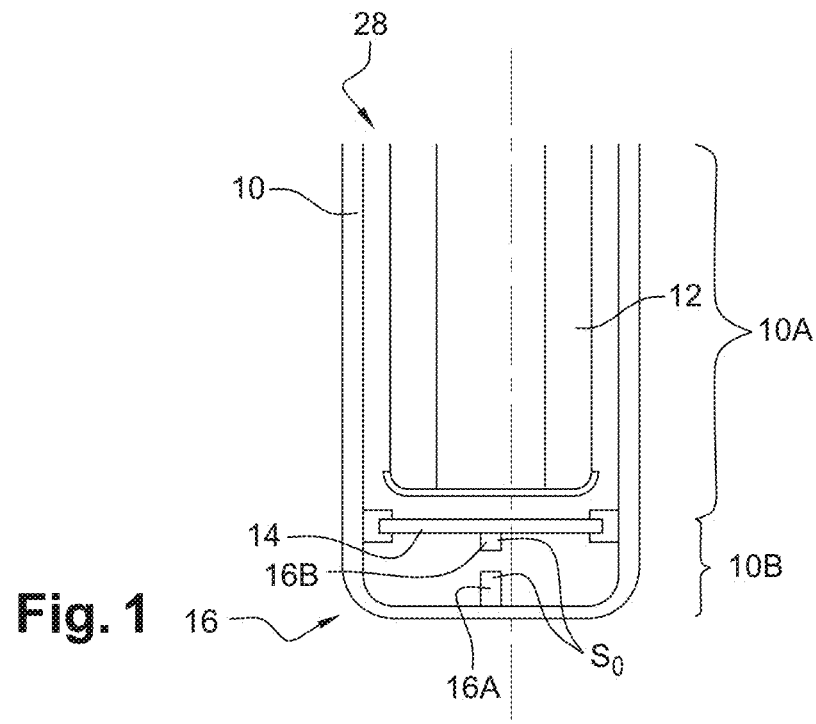
FIG. 1 is a view in section depicting the mechanical switch control system when the phase is liquid
Figure 2:
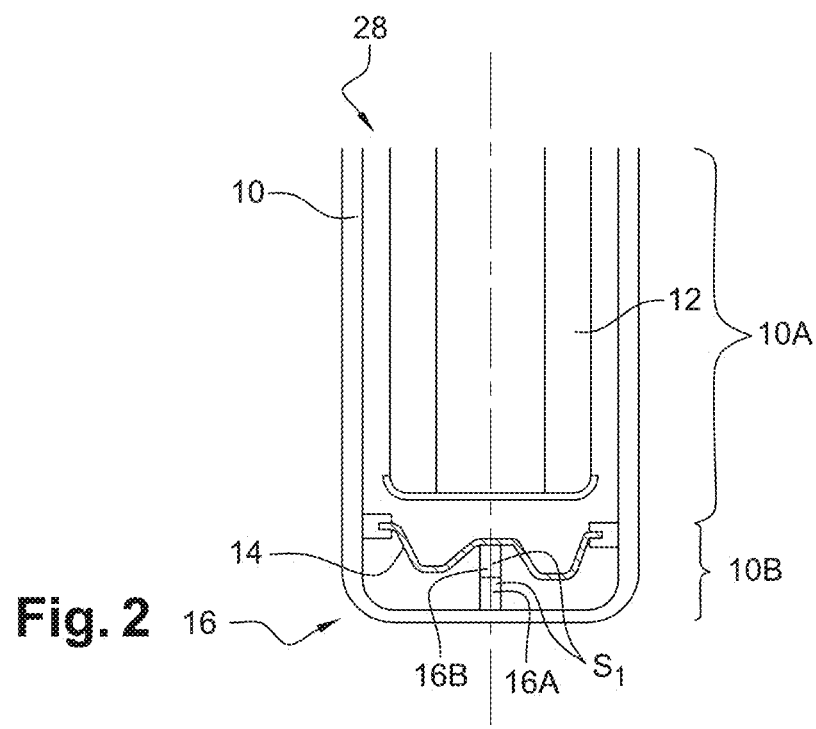
FIG. 2 is a view in section depicting the mechanical switch control system when the phase is solid

In a first embodiment (FIG. 1, FIG. 2), the invention describes a triggering means which has a mechanical type switch 16 control system triggering an electrical signal upon a change in phase of the aqueous solution. A system for triggering an electrical signal is situated inside an aqueous solution filter housing 10. The housing 10 is made up of two filter half-housings 28, which are produced by systems for injection-molding of plastics or by systems for the shaping of metal materials. The two parts correspond, one of them, to the bottom part 10B of the housing and, the other, to the top part of the housing 10A. The triggering system comprises a membrane 14 which is preferably situated in the bottom of the housing 10B, below the filter layer 12. The membrane 14 can deform when the aqueous solution passes from the liquid phase to the solid phase. Upon the change in phase, the volume of the aqueous solution increases and pushes against the membrane 14 situated beneath. The membrane 14 is fixed and held at its periphery by bonding, overmolding or by a clamping system which consists in closing the two half-housings onto the membrane 14 using various means of sealed assembly which are as follows in the case of plastics materials: hot-welding method, the three methods of vibration welding (ultrasound welding, vibration welding or even a combination of the two ultrasound and vibration methods). The membrane 14 comprises the first electrical contact 16A of the mechanical switch control system bonded to the membrane 14 facing toward the bottom of the lower housing 10B. The second electrical contact 16B of the mechanical switch control system is mounted opposite and bonded into the bottom of the lower housing 10B, and oriented toward the upper part of the housing 10A. Upon the change in phase of the aqueous solution from the liquid phase to the solid phase, its volume increases and deforms the membrane 14 and this causes the two electrical contacts 16A and 16B of the signaling system 16 to touch and results in the closing of the switch, which then triggers an electrical signal S1 which will allow the system for heating the aqueous solution to be started.

Figure 3:
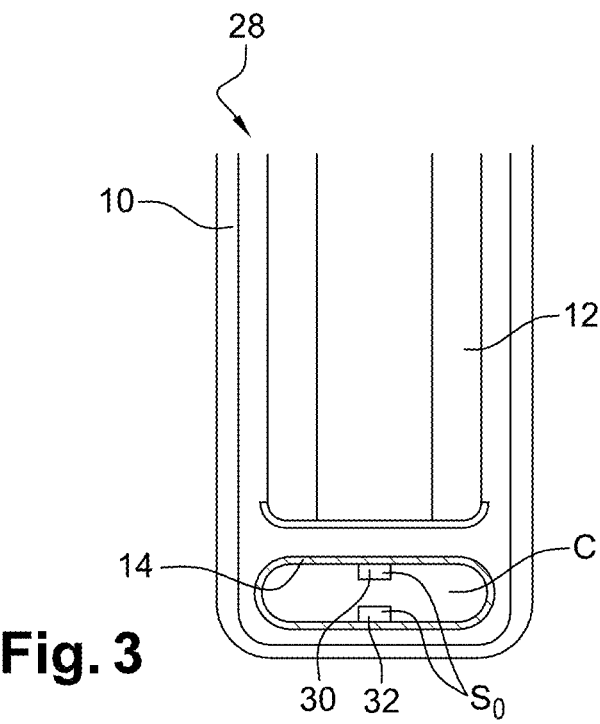
FIG. 3 is a view in section depicting the switch control system with contacts built into the deformable element when the phase is liquid
Figure 4:
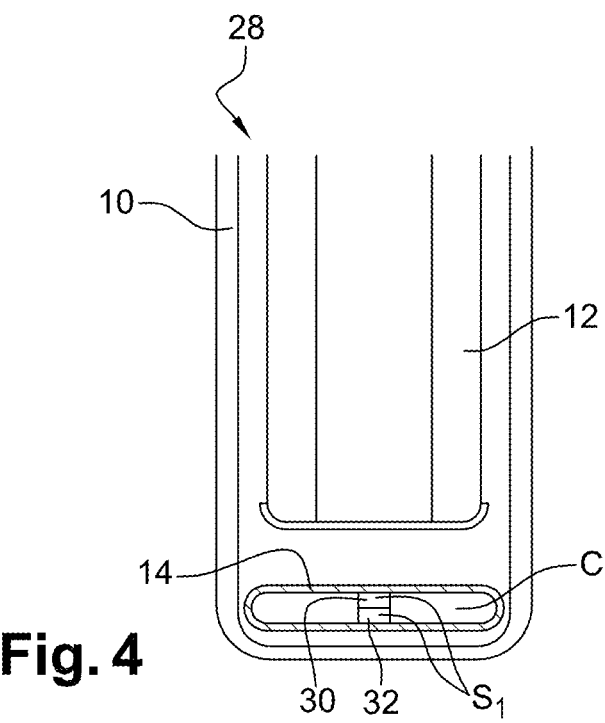
FIG. 4 is a view in section depicting the switch control system with contacts built into the deformable element when the phase is solid

In a second embodiment (FIG. 3, FIG. 4), the invention describes a system for triggering an electrical signal upon a change in phase of the aqueous solution which has a system for controlling the switch that is of the electrical contact on membrane type. The system for triggering an electrical signal is situated inside an aqueous solution filter housing 10. The triggering system comprises a membrane 14 preferably situated in the bottom of the housing 10, underneath the filter layer 12. The membrane 14 is made up of a closed envelope of round, spheroidal, rounded-corner rectangular or rugby-ball shape. The membrane 14 can be deformed upon the change in phase of the aqueous solution from the liquid phase to the solid phase and vice versa. The membrane 14 contains either a gas or a soft foam. Upon the change of the freezing of the liquid phase, its volume increases and pushes against the membrane 14 situated beneath. The membrane 14 comprises two electrical contacts 30,32, situated one facing the other, on each side of the membrane, the first contact 30 at the top on the membrane and the second contact 32 at the bottom on the membrane, which are either overmolded or bonded to the membrane 14, inside the interior chamber (C). When the aqueous solution passes from the liquid phase to the solid phase, its volume increases and deforms the membrane 14 causing the two contacts 30,32 of the switch system to touch, thereby closing the switch which itself triggers an electrical signal S1 so as to allow the aqueous solution heating system to be started.

Figure 5:
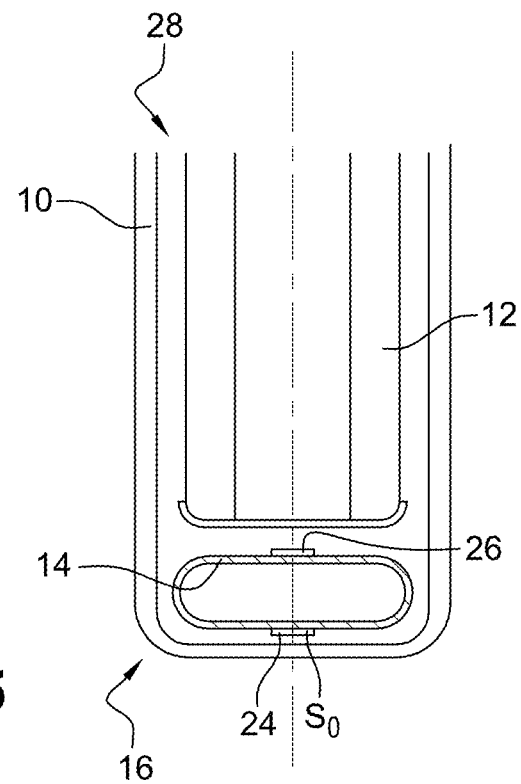
FIG. 5 is a view in section of the Reed switch control system when the phase is liquid
Figure 6:
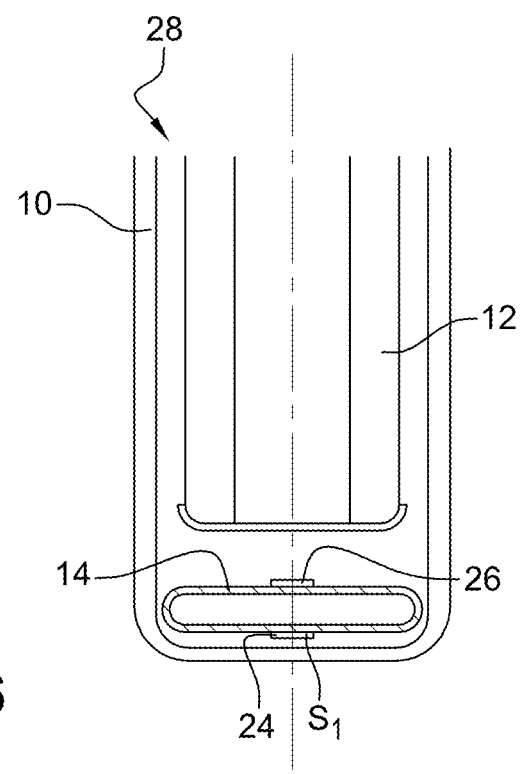
FIG. 6 is a view in section of the Reed switch control system when the phase is solid

In a third embodiment (FIG. 5, FIG. 6), the invention describes a device for triggering an electrical signal upon a change in phase of the aqueous solution from the liquid phase to the solid phase and vice versa. This device has a switch 16 control system of the Reed contact type (magnetic switch placed in a protective bead of glass). The device for triggering an electrical signal is situated inside a housing 10 of the filter. The triggering device comprises a membrane 14 which is preferably situated in the bottom of the housing 10, beneath the filter layer 12. The membrane 14 can be deformed when the aqueous solution passes from the liquid phase to the solid phase. The membrane 14 is made up of a closed envelope of round, spheroidal, rounded-corner rectangular or rugby-ball shape. The membrane 14 contains either a gas or a soft foam. Upon the change in phase, the volume of the aqueous solution increases and pushes against the membrane 14 situated beneath. The membrane 14 comprises a magnet and a Reed switch, situated one facing the other with respect to the center of the volume and which are either fixed by bonding or by some other system of attachment. Upon the passage of the aqueous solution to the solid phase, its volume increases and deforms the membrane 14 which moves the magnet 26 closer to the Reed switch 24. As the magnet nears the Reed switch 24, the Reed switch 24 closes and triggers an electrical signal S1 to allow the aqueous solution heating system to be started. The switch logic may be reversed: the increase in volume of the solid phase may bring the magnet closer to the Reed switch which then opens; the heating controller, of the electronic circuit or electromechanical relay type, then supplies power for the heating.

Figure 7:
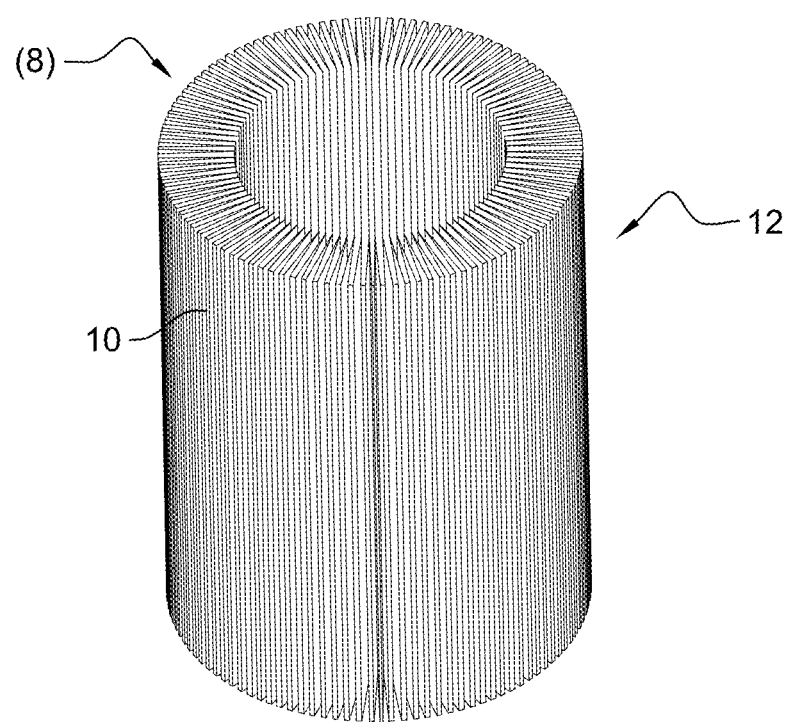
FIG. 7 is a depiction of the pleated filter element.

In accordance with FIG. 7, we have, for example, an aqueous solution filter element 8 provided with a heating means 12 for example incorporated into a filter layer 10.

In a first embodiment, a heating means 12 is completely incorporated into the filter layer 10. The filter layer 10 is preferably made up of a cellulose-based medium with carbon fillers, carbon being a conductor of electricity. Alternatively, the carbon filler may be replaced by tracks printed in conductive ink or any other electrically conducting element. The electrical conduction property of the carbon fillers and of the tracks printed in conductive ink or any other electrically conducting element means that heat can be released through these elements through a Joule-heating effect. The filter layer may also be made up of a medium based on synthetic fabric. A heating means device is fully described in the application filed on this day under the title "Filtre à solution aqueuse avec moyen de chauffage [Aqueous solution filter with heating means]".

The invention claimed is:

1. A filter for an aqueous solution of a diesel vehicle selective catalytic reduction system, the filter comprising
a housing provided with an inlet and with an outlet;
a filter element inside the housing;
a means which detects variations in volume associated with changes in phase of the aqueous solution; and
a signaling means which signals the variations in volume, the signaling means comprising a switch that switches upon changes in phase of the aqueous solution.

2. The filter as claimed in claim 1, in which the signaling means additionally comprises a deformable membrane collaborating with the switch to signal change in phase of the aqueous solution.

3. The filter as claimed in claim 2, in which the deformable membrane defines an expansion chamber for the variations in volume.

4. The filter as claimed in claim 3, in which the expansion chamber is filled with a gas or with a soft foam.

5. The filter as claimed in claim 3, in which the switch is situated in the expansion chamber.

6. The filter as claimed in claim 2, in which the deformable membrane is planar.

7. The filter as claimed in claim 2, in which the switch comprises at least one contact arranged on the deformable membrane.

8. The filter as claimed in claim 2, in which the switch is activated by a magnet, the switch being a Reed-type switch, the switch or the magnet being arranged on the deformable membrane.

9. The filter as claimed in claim 1, in which the filter comprises a heating means incorporated into the filter element.

10. The filter as claimed in claim 1, in which the switch comprises a first electrical contact and a second electrical contact such that the first electrical contact and the second electrical contact are placed in electrical communication which triggers an electrical signal, and taken out of electrical communication with each other, upon changes in phase of the aqueous solution.

* * * * *